June 16, 1925.  1,541,875
E. W. VARNEY
MACHINE FOR AND METHOD OF LASTING SHOES
Filed Aug. 21, 1920   3 Sheets-Sheet 1
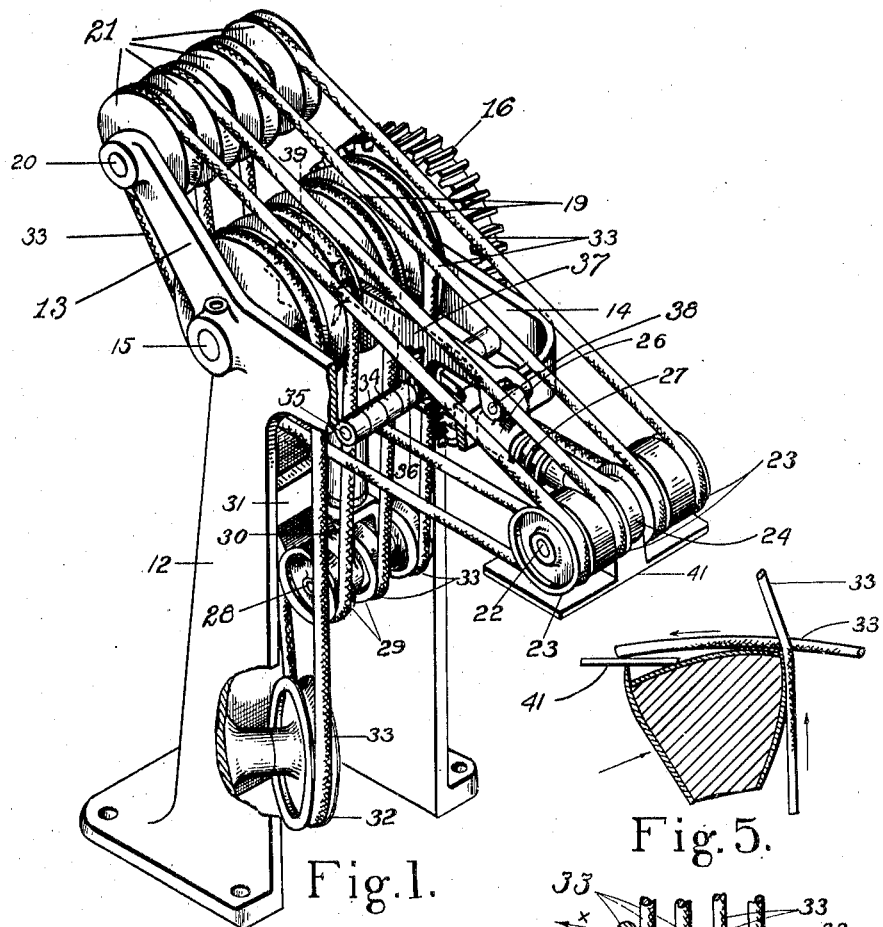
Fig. 1.
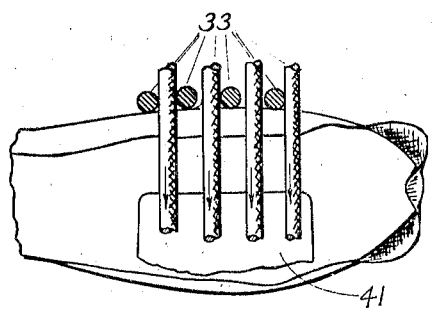
Fig. 6.
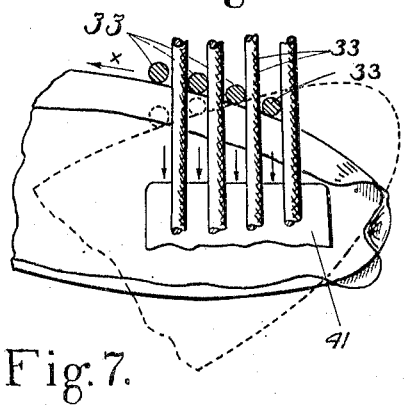
Fig. 5.
Fig. 7.
INVENTOR
Everett W. Varney June 16, 1925.

E. W. VARNEY

MACHINE FOR AND METHOD OF LASTING SHOES

Filed Aug. 21, 1920      3 Sheets-Sheet 2

1,541,875

INVENTOR
Everett W. Varney

June 16, 1925.

E. W. VARNEY 1,541,875

MACHINE FOR AND METHOD OF LASTING SHOES

Filed Aug. 21, 1920    3 Sheets-Sheet 3

INVENTOR

Everett W Varney

Patented June 16, 1925.

1,541,875

UNITED STATES PATENT OFFICE.

EVERETT W. VARNEY, OF NEWTON, MASSACHUSETTS, ASSIGNOR TO UNITED SHOE MACHINERY CORPORATION, OF PATERSON, NEW JERSEY, A CORPORATION OF NEW JERSEY.

MACHINE FOR AND METHOD OF LASTING SHOES.

Application filed August 21, 1920. Serial No. 404,983.

*To all whom it may concern:*

Be it known that I, EVERETT W. VARNEY, a citizen of the United States, residing at Newton, in the county of Middlesex and State of Massachusetts, have invented certain Improvements in Machines for and Methods of Lasting Shoes, of which the following description, in connection with the accompanying drawings, is a specification, like reference characters on the drawings indicating like parts in the several figures.

This invention relates to methods and machines for use in lasting shoes and more particularly to methods and machines for lasting shoes in which the upper is secured to the bottom of the sole in lasted position by means of cement, as, for example, in the manufacture of shoes having fabric uppers, which shoes are to have rubber outsoles vulcanized to them.

In the manufacture of shoes having rubber soles which are subjected to vulcanization, the innersole, in accordance with the usual practice, is formed of a rubber compound generally known as "rag stock." This innersole is relatively thin and pliable and its outer surface is rendered tacky by the application of a suitable rubber compound. The upper of the shoe, when prepared for lasting, has the inner face of its margin coated with rubber cement which, when brought in contact with the tacky surface of the innersole, adheres firmly thereto. Heretofore shoes of this kind have been lasted almost entirely by hand, the upper being merely bent over the edge of the last against the innersole by a rocking or wiping movement of the hand, particularly of the thumb.

This hand work is exceedingly laborious and by reason of the consequent fatigue of the operator uniform results in the course of a day's work are difficult to obtain. As a consequence the manufacturer finds in his product a large number of "reject" shoes which have to be disposed of, if at all, at a greatly reduced, or no, profit. Furthermore, it is practically impossible for an operator to apply with his fingers any substantial tension to the upper to shape it to the contour of the last since the effort required for the mere working over of the upper properly upon the innersole taxes the endurance of a person of ordinary strength when kept up continuously in the day's work.

An object of this invention is to provide a machine for doing this work more rapidly than it can be done by hand and for performing the stretching and overlaying of the upper more effectually than is possible by human agency alone.

A feature of the invention consists in flexible means operating uniformly by frictional drag to overwipe the shoe upper upon the shoe bottom. The flexible means may comprise a yielding belt which acts frictionally and continuously to bend over the upstanding margin of the upper and lay it against the margin of the shoe bottom against the innersole. Preferably and as herein shown, a plurality of belt runs, arranged in close proximity, are provided which act simultaneously upon the portion of the upper being treated.

Another feature of the invention consists in novel means for treating the overlaid upper by impact, for example, by rapidly repeated blows during the overwiping operation. Preferably and as shown herein, the blows are delivered upon the flexible yielding means through which the force of impact is transmitted to the shoe upper to cause firm adhesion between the upper and the tacky surface of the innersole.

Another feature of the invention consists in an organization by which the means for delivering blows to beat the upper is given a component of movement in a direction inwardly of the shoe bottom as well as a component of movement perpendicular to the shoe bottom. The inwardly directed component is, therefore, in the same direction as the movement of the flexible yielding means which wipes the upper over the shoe bottom. Preferably also the portion of the blow delivering means or beater which engages the flexible yielding means is movable with the flexible yielding means while in momentary contact therewith.

Another feature of the invention consists in the combination with flexible overwiping means, of means for upwiping the upper at the side of the shoe adjacent to the portion being overwiped by the flexible means.

The upwiping means is preferably flexible and yielding and acts by its frictional drag to upwipe and tension the shoe upper at the side of the shoe toward the last bottom. As herein shown, a plurality of upwiping means in the form of belt runs are provided which act to upwipe and tension the upper at the side of the shoe adjacent to the marginal portion which is being overwiped by the overwiping means.

Another feature of the invention consists in the combination of a plurality of continuously operating upwiping means and a plurality of continuously operating overwiping means. As shown herein, individual members of each plurality of wiping means are arranged alternately with the individual members of the other plurality of wiping means; that is, the wiping means are interdigitally arranged. Each set of wiping means may comprise a series of belt runs arranged yieldingly to engage the upper and wipe and tension it in the direction of travel of the belt runs. One series of belt runs is preferably arranged at an angle to the other series of belt runs, the angle being variable and corresponding approximately to the angle between the side of the last and the bottom of the last. The beating or impacting means above referred to, which acts upon the overlaying means, may be arranged to act upon all of the overlaying belt runs to force the upper against the shoe bottom, or, if it is desired, may be arranged to act only upon some of those belt runs, for example, upon one or more of the belt runs which last treat the upper as the lasting operation progresses about the periphery of the shoe.

Another feature of the invention consists in an organization for effecting a more rapid operation of the overwiping means than of the upwiping means to secure an increased frictional drag upon the portion of upper which is wiped over the shoe bottom.

Another feature of the invention consists in an organization whereby the direction of movement of the overwiping means relatively to the edge of the shoe may be such as to cause the overwiping to be effected in a direction inclined toward the toe of the shoe or inclined toward the heel.

Another feature of the invention consists in an organization of the machine whereby the direction of movement of the upwiping means relatively to the shoe bottom may be varied to cause the upwiping to be effected upwardly and toward the toe of the shoe or upwardly and toward the rear of the shoe to secure the stretching of the upper in the direction of the sole edge or to gather the upper for disposing of excessive fullness thereof. As shown herein, a change in the action of the overwiping means may be effected with or without a change in the position of the plane of action of the series of upwiping belts. Conversely, a change in the direction of action of the upwiping means may be effected with or without a change in the position of the plane of action of the series of overwiping belt runs.

The novel method practiced in the use of the machine consists in upwiping a portion of a shoe upper, then overwiping the upwiped portion, and beating down the overwiped portion into engagement with the innersole. The upwiping may be continued during the overwiping and beating which preferably are performed simultaneously. Preferably the upwiping is effected along a plurality of closely adjacent lines and the overwiping along lines located between the lines of upwiping. The beating preferably comprises the application of an impactive force through a yielding medium which may conveniently be the overwiping means, said means preferably comprising elastic belts of friction material such as rubber, to the outer faces of which the impactive force is intermittently applied to cause the areas of contact of the belts to be extended laterally.

The method further consists in upwiping the upper along a plurality of lines at an angle to the plane of the shoe bottom to tension the upper longitudinally as well as transversely of the last, and in overwiping the upper along a plurality of lines at an angle to the edge of the last to produce a gathering effect upon the upper.

These and other features of the invention will appear more fully from the following description when read in connection with the accompanying drawings and will be pointed out in the appended claims.

In the drawings,

Fig. 1 is a broken out perspective view of one embodiment of my invention organized to carry out my improved method;

Figs. 5, 6 and 7 are views, diagrammatic in character, illustrating methods of lasting according to my invention.

Figure 2:
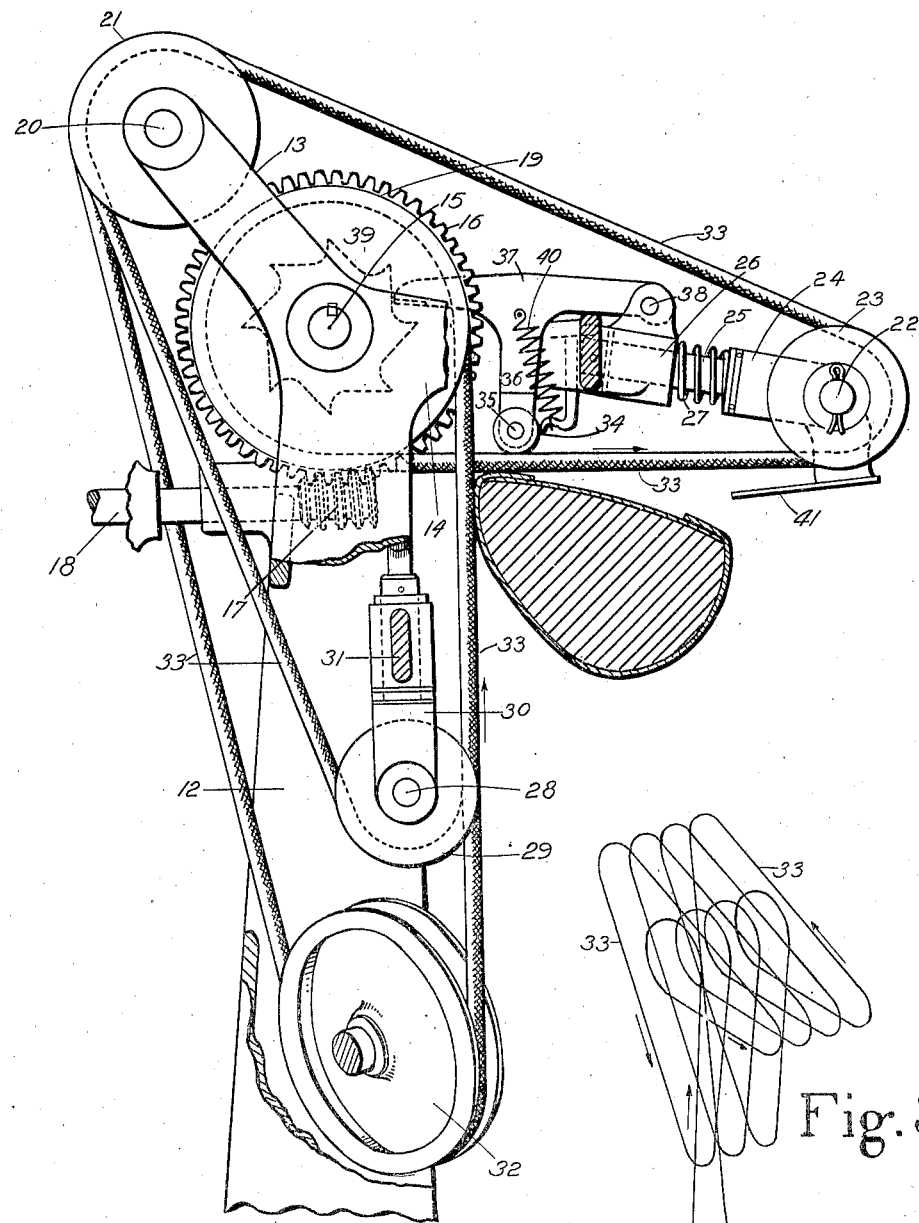
Fig. 2 is a side elevation of the same, partly in section.

Referring first to Figs. 1 and 2, the frame of the machine comprises a standard 12 having a rearwardly extending arm 13 and a front yoke-shaped arm 14.

Mounted in suitable bearings is a shaft 15 having a worm wheel 16 driven by a worm 17 carried by a shaft 18 actuated by any suitable power, preferably an electric motor.

Carried by the shaft 15 are pulleys 19 by means of which the single continuous belt is driven, as hereinafter described. Supported by the rear arm 13 is a stud shaft 20 carrying a series of idle pulleys 21. A shaft 22, carrying a series of idle pulleys 23, is mounted in a bearing block 24 the stem 25 of which is mounted in a socket provided in a bearing 26 formed as a part of, or secured to, the yoke arm 14. A spring 27 between the bearing 26 and the block 24 serves yieldingly to maintain the block 24, its stem 25 and the pulleys 23, outward, to keep the belt 33 under tension and to compensate for stretching of the belts.

A shaft 28 carrying a series of idle pulleys 29 is mounted in a yoke 30 depending from and secured to a cross web 31 of the frame. A single idle pulley 32 is mounted on a stud shaft suitably supported by the frame near the lower end thereof and preferably at an angle such as illustrated in Figs. 1 and 2.

Figure 3:
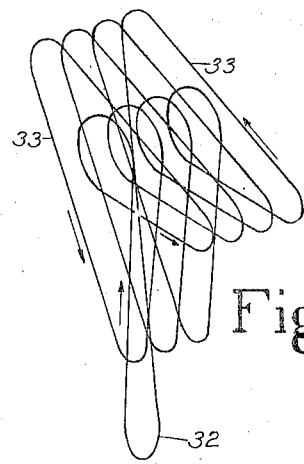
Fig. 3 is a diagrammatic perspective view illustrating the course of the single belt employed in the machine shown in Fig. 1.

A single endless belt 33 of friction material and suitably of elastic material such as rubber, is mounted so as to run progressively over all of the pulleys hereinbefore described, the course of such belt being most clearly illustrated in Fig. 3. The direction of the belt is such that a plurality of runs of the belt move in a substantially vertical direction and another plurality of runs of the belt extend in a substantially horizontal direction, so that the vertically moving runs of the belt operate to wipe the upper of a shoe up the side of a last and the horizontal runs of the belt operate to wipe the marginal portion of the upper over and against the shoe bottom as illustrated in Figs. 2, 5 and 6.

Owing to the fact that the belt runs are all substantially equally elastic and are capable of being flexed more or less according to the degree of pressure brought to bear against them by the operator when moving the shoe along, the lasting action of the belt runs can be varied considerably and effected continuously and progressively along the shoe.

Normally the vertical runs of the belt are in the relative positions shown in Fig. 6. The last and the shoe parts thereon may be manipulated by the operator, while moving the shoe along so that the belt runs toward one edge of the series will be flexed more than the belt runs at the other edge of the series, this depending upon the angle of presentation of the work to the belt runs and the amount of pressure against said runs either upward against the horizontal runs or laterally against the vertical runs. If the shoe is held in the position indicated by full lines in Fig. 7 and is moved along past the belt runs in the direction of the arrow X in said figure, the vertical belt runs 33 will act with gradually increasing pressure. This is because the vertical belt run 33 at the left is flexed more than the one at the right of the series. The same is true as to the horizontal belt runs. That is, by tilting the shoe endwise, the horizontal belt runs may be caused successively to act with increasing step-by-step pressure.

The full and dotted line representations of different positions of the shoe indicated in Fig. 7 are to illustrate how the margin of the shoe upper may be gradually worked toward either the toe end or the heel end according to the degree of lateral angular position in which the shoe is held by the operator while moving it past the belt runs.

In order more firmly to secure the cemented portions of the margin of the upper to the shoe bottom, I employ a beating mechanism to act upon the horizontal runs of the belt. The mechanism for doing this, as illustrated in Figs. 1 and 2, comprises a series of rolls 34 mounted upon a pin 35 carried by an arm 36 of a lever 37 which is pivotally connected at 38 to the bearing member 26. The other end of the lever 37 extends into the path of operation of a tappet cam 39 carried by the shaft 15, a spring 40 being connected at one end to the lever 37 and at the other end to any suitable support. The relative proportions of the parts of this mechanism are such that as the shaft 15 revolves the tappet cam acts upon the lever 37 to lift it while the spring 40, as soon as each cam rise leaves the end of the lever 37, pulls the lever down and causes the beaters 34 to act through the horizontal runs of the belt to beat down the margin of the upper.

Preferably a suitably supported guard plate 41 is employed to protect the unlasted portion of the upper so that said unlasted margin can not be moved into contact with the horizontal stretches of the belt.

Figure 4:
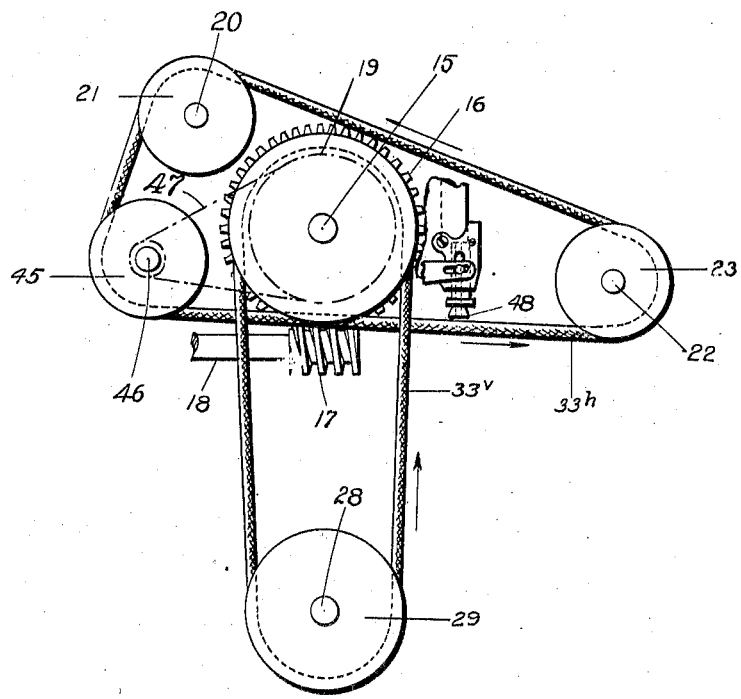
Fig. 4 is a diagrammatic side elevation of a different embodiment of the invention.

I do not limit myself to the employment of a single belt following a course to present a plurality of parallel runs. As indicated in Fig. 4, a series of belts 33$^v$ may be mounted upon the upper and lower pulleys 19, 29 and another series of belts 33$^h$ may be mounted upon pulleys 23 and 21, and also over a third series of pulleys 45 secured to a driven shaft 46. With such a structure I am able to drive the pulleys 45 at a peripheral speed different from that of the pulleys 19, such difference of speed being to cause the runs 33$^h$ to travel at a higher speed than that of the runs 33$^v$. This difference of speed may be effected by means of sprocket gearing including a chain 47 connecting the shafts 15 and 46 as indicated by dotted circles in Fig. 4. Since the shaft 15 is positively driven, as hereinbefore described in connection with Fig. 2, the gear connections between shafts 15, 46 provide for driving the pulleys 45 so as to impart a higher speed to the belt runs 33$^h$ than the speed of the belt runs 33ᵛ. With this structure the shoe may be so manipulated that while the vertical belt runs will operate to wipe the upper on the sides of the last toward the shoe bottom, that wiping action is somewhat increased by the action of the horizontal belt runs.

A preferred method of lasting shoes by means of my machine is to grasp the shoe in the hands and present a portion of the side of the shoe first to the vertical belt runs 33ᵛ at a point low enough to avoid contact of the edge of the upper with the horizontal runs 33ʰ, thus effecting a uniform and continuous upwiping of that portion of the upper. The shoe is then raised or allowed to be lifted by friction of the vertical runs till the upwiped portion is engaged by the horizontal runs 33ʰ and overwiped upon the shoe bottom. Upward pressure on the shoe during the overwiping brings the beaters into action and impactive force is applied to the overlaid upper through the yielding media afforded by the flexible overwiping belts. If the belts are of rubber the impactive force causes the belts to be flattened to extend the lines of contact laterally from the lines of first engagement.

I do not limit myself to the employment of beaters such as hereinbefore described. If a machine of this character is to be employed for lasting leather shoes, which require tacks for securing the margin of the upper, I may employ suitable tack driving mechanism with a nozzle located as indicated at 48 in Fig. 4, said mechanism being adapted to drive tacks through the margin of the upper, the nozzle 48 being, of course, located to direct the tacks between two of the belt runs 33ʰ. For this purpose a tacking mechanism having a tripping nozzle may conveniently be employed such, for example, as that disclosed in United States Letters Patent No. 1,188,618, granted June 27, 1916, on application of Matthias Brock. With such an organization as shown in Fig. 4 the operator may cause a tack to be driven through the overlaid upper by raising the shoe against the horizontal runs 33ʰ and lifting them sufficiently to enable the shoe to engage and trip the nozzle 48 of the tacker.

Having thus described my invention, what I claim as new and desire to secure by Letters Patent of the United States is:

1. That improvement in the art of working shoe uppers over lasts which consists in simultaneously and uninterruptedly rubbing an upper at one side of a last at a plurality of adjacent locations, and then simultaneously and uninterruptedly overwiping upon an innersole the upper on the same side of the last at a plurality of adjacent locations.

2. That improvement in the art of working shoe uppers over lasts which consists in simultaneously and uninterruptedly rubbing an upper at the side of a last and then against an innersole on the bottom of said last at a plurality of laterally adjacent locations.

3. That improvement in methods of lasting shoes which consists in upwiping a portion of a shoe upper at the side of a last, then overwiping the upwiped portion and beating the upper against the innersole.

4. That improvement in methods of lasting shoes which consists in upwiping a portion of a shoe upper at the side of the shoe, then overwiping said portion of upper against the innersole and applying to the overwiped portion of upper an intermittently active force.

5. That improvement in methods of lasting shoes which consists in upwiping a portion of a shoe upper at the side of a last, then overwiping the upwiped portion and simultaneously beating the upper against the innersole.

6. That improvement in methods of lasting shoes which consists in upwiping a portion of a shoe upper at the side of a last, then overwiping the upwiped portion and simultaneously beating the upper against the innersole while continuing the upwiping at the side of the shoe.

7. That improvement in methods of lasting shoes which consists in upwiping a portion of a shoe upper along closely adjacent lines at the side of the shoe, then overwiping the said portion of upper along lines between the lines of upwipe and simultaneously applying an impactive force to the overwiped portion.

8. That improvement in methods of lasting shoes which consists in upwiping a portion of a shoe upper along lines at the side of the shoe, then overwiping the said portion of upper against the innersole along lines located between the lines of upwipe and simultaneously applying an impactive force to the overwiping means to cause the overwiped portion firmly to adhere to the innersole.

9. That improvement in methods of lasting shoes which consists in upwiping a portion of a shoe upper along closely adjacent lines at the side of the shoe, then overwiping the said portion of upper along lines between the lines of upwipe and simultaneously applying to the upper an impactive force through an interposed elastic medium.

10. That improvement in methods of lasting shoes which consists in upwiping a portion of a shoe upper along closely adjacent lines at the side of the shoe, then overwiping the said portion of upper along lines at substantially right angles to the lines of upwipe and simultaneously applying to the upper an impactive force.

11. That improvement in methods of lasting shoes which consists in upwiping a portion of a shoe upper along closely adjacent lines at the side of the shoe, then overwiping the said portion of upper along lines between the lines of upwipe and simultaneously intermittently applying force to the overwiped portion of upper.

12. A machine of the class described having, in combination, a plurality of wiping belt runs mounted to present a plurality of their operative portions in each of two intersecting planes.

13. A machine of the class described having, in combination, a plurality of independently yieldable wiping belt runs mounted to present a plurality of their operative portions in each of two intersecting planes.

14. A machine of the class described having, in combination, a plurality of wiping belt runs mounted to present a plurality of their operative portions in each of two planes which intersect at an angle of substantially 90 degrees.

15. In a machine of the class described, two sets of continuously movable wipers, each set comprising a plurality of members side by side, the two sets being relatively mounted to operate in intersecting planes.

16. A machine of the class described having, in combination, flexible means acting frictionally to wipe an upper over a shoe bottom, and additional means for moving the flexible means downwardly against the shoe bottom to beat the upper.

17. A machine of the class described having, in combination, a yielding belt having a uniform friction surface arranged over a shoe bottom, and means for operating the belt to cause the belt to engage the upwardly extending margin of a shoe upper and lay it by a uniform frictional drag against the shoe bottom.

18. A machine of the class described having, in combination, a plurality of belts arranged in close proximity to each other, and means for operating the belts simultaneously to wipe an upper over and against a shoe bottom.

19. In a machine of the class described, the combination of means operated to upwipe an upper, means operated to overwipe the upper, and power means to operate both said wiping means and to cause one of said wiping means to be operated at a higher rate than the other.

20. In a machine of the class described, the combination of means operated to upwipe an upper, means operated to overwipe the upper, and power means for operating the overwiping means at a higher rate than the upwiping means.

21. In a machine of the class described, the combination of a plurality of upwiping belt runs, a plurality of overwiping belt runs, and means for operating the belt runs at different speeds.

22. In a machine of the class described, the combination of a plurality of upwiping belt runs, a plurality of overwiping belt runs, and means for operating the overwiping belt runs at a higher speed than the upwiping belt runs to produce a tensioning effect upon the upper treated by the overwiping runs.

23. In a machine for working uppers over lasts, the combination of means for rubbing an upper against the side of a last, means for laying the upper over the bottom of the last, and means for beating the laid over upper against the bottom of the last.

24. In a machine for working uppers over lasts, the combination of means for wiping an upper up the side of a last, means for laying the upper over the bottom of the last, and means for treating the overlaying means by impact to force the upper against the last bottom.

25. In a machine for working uppers over lasts, the combination of means for wiping an upper up the side of a last, means for laying the upper over the bottom of the last, and means for subjecting the overlaid upper to the action of rapidly repeated blows.

26. In a machine for working uppers over lasts, the combination of means operating continuously to lay an upper over the bottom of a last, and means for treating the overlaid upper by impact.

27. In a machine for working uppers over lasts, the combination of means operating continuously to wipe successive portions of an upper over the bottom of a last, and means for applying rapidly repeated blows to the continuously operated means.

28. In a machine for working uppers over lasts, the combination of means for positioning a shoe, a plurality of deformable round belts movable to wipe the upper over the last bottom along narrow parallel areas, and means for deforming the belts to cause the areas of contact to expand laterally of the direction of wiping movement.

29. A machine of the class described having, in combination, shoe positioning means, and a plurality of mechanically driven belts for wiping an upper over and against the bottom of a last.

30. A machine of the class described having, in combination, a plurality of belts for upwiping an upper at the side of a shoe, and a plurality of belts for wiping the upper at the same side of the shoe over the bottom of the shoe, said belts being interdigitally arranged.

31. In a machine of the class described, means for upwiping an upper at the side of a shoe, means moving inwardly of the shoe to overwipe the upper, and means for delivering blows to the overwiping means having a component of movement in the direction of travel of the upwiping means.

32. In a machine for working uppers over lasts, the combination of means operating continuously to wipe an upper at the side of a shoe, and means operating continuously to wipe the upper over the shoe bottom, the said overwiping means being arranged for change of plane of action to give the upwiping means a forward or rearward inclination relative to the edge of the shoe.

33. In a machine for working uppers over lasts, the combination of means operating continuously to wipe an upper at the side of a shoe, and means operating continuously to wipe the upper over the shoe bottom, the said upwiping means being arranged for change of plane of action to allow the overwiping means to act at an inclination to the shoe edge.

34. In a machine for working uppers over lasts, the combination of means for overwiping an upper, and means for beating the overwiping means, said beating means being constructed and arranged to travel in the direction of movement of the wiping means during its contact with the wiping means.

35. In a machine for working uppers over lasts, the combination of means for rubbing an upper at the side of a last, means for laying the upper over the bottom of the last, and means for delivering repeated blows to the overlaying means during its passage over the portion of upper laid against the bottom of the sole.

36. In a machine for working uppers over lasts, the combination of means for rubbing an upper at the side of a last, means for simultaneously laying the upper over the bottom of the last, and means for causing the overlaid upper to be secured to the shoe bottom.

37. In a machine for working uppers over lasts, the combination of means for wiping an upper at the side of a last, continuously acting means for laying the upper over the bottom of the last, and means for treating the overlying means to rapidly repeated blows to force the upper against the last bottom.

38. In a machine for working uppers over lasts, the combination of means for wiping an upper upwardly against the side of a last, means for laying the upper over the bottom of the last, and means for subjecting the overlaying means to blows delivered with a downward component of movement and with a component of movement in the direction of travel of the overlaying means.

39. In a machine for working uppers over lasts, the combination of means operating continuously to lay an upper over the bottom of a last, and means for treating the overlaying means by impact.

40. In a machine for working uppers over lasts, the combination of means operating continuously to work successive portions of an upper over the bottom of a last, and means for applying rapidly repeated blows to the continuously operated means, said blows being delivered with a component of movement in the direction of movement of the continuously operating means.

41. In a machine for working uppers over lasts, the combination of means for positioning a shoe, a plurality of flexible members arranged in close proximity at the side of the shoe, and continuously operating flexible members arranged between said flexible members to wipe the upper over the bottom of the shoe.

42. A machine of the class described having, in combination, shoe positioning means, a plurality of belts arranged in close proximity for wiping an upper over and against the bottom of a shoe, and power means for driving the belts.

43. A machine of the class described having, in combination, a plurality of belts for upwiping an upper at the side of a shoe, a plurality of belts for wiping the upper over the bottom of the shoe, said belts being interdigitally arranged, and means for delivering repeated blows to the over-wiped upper.

44. In a machine of the class described, means moving inwardly of the shoe to overwipe the upper, and beating means for delivering blows to the overwiping means, said beating means having its beating face arranged for movement in the direction of travel of the overwiping means.

45. In a machine for working uppers over lasts, the combination of means for wiping successive portions of an upper up the side of a last, means for laying the upwiped portion over the bottom of the last, and means for beating the laid over upper against the bottom of the last.

46. In a machine for working uppers over lasts, the combination of means for wiping an upper up the side of a last, yielding means for laying the upper over the bottom of the last, and means for treating the overlaying means by impact to force it against the upper upon the last bottom.

47. In a machine for working uppers over lasts, the combination of means for wiping an upper at the side of a last, a yielding belt arranged to travel over the bottom of the last, and means for subjecting the belt to the action of rapidly repeated blows, the belt acting as a cushioning and force distributing means between the beating means and the upper.

48. In a machine for working uppers over lasts, the combination of yielding means operating continuously to bend an upper over the bottom of a shoe, and means for treating the said means by impact to force the upper against the shoe bottom.

49. In a machine for working uppers over lasts, the combination of means operating continuously to bend successive portions of an upper over the bottom of a last, and means for applying rapidly repeated blows to the bent over upper to force it into contact with the innersole.

50. A machine of the class described having, in combination, shoe positioning means, a plurality of flexible and yielding belts for wiping an upper over the bottom of a last, and means responsive to upward pressure of the shoe for inserting fastenings to hold the lasted upper in position.

51. In a machine for working uppers over lasts, the combination of means operating continuously to wipe an upper at the side of a shoe, and means operating continuously to wipe the upper over the shoe bottom, the said overwiping means being arranged for change of plane of action while the direction of its action relatively to the shoe is maintained to give the upwiping means a forward or rearward inclination relative to the edge of the shoe.

52. In a machine for working uppers over lasts, the combination of means operating continuously to wipe an upper at the side of a shoe, and means operating continuously to wipe the upper over the shoe bottom, the said upwiping means being arranged for change of plane of action while the direction of its action relatively to the shoe is maintained to allow the overwiping means to act at an inclination to the shoe edge.

53. In a machine for working uppers over lasts, the combination of means for positioning a shoe, a deformable round belt for wiping the upper over the shoe bottom along a narrow area of contact, and means for applying force to the belt to cause its area of contact to be laterally expanded.

54. In a machine for working uppers over lasts, the combination of a plurality of deformable round belts arranged close to each other and acting to wipe the upper over the last along substantially parallel areas, and means for deforming the belts to cause the areas of contact to expand laterally of the direction of wiping movement.

55. In a machine for working uppers over lasts, the combination of means for wiping successive portions of an upper up the side of the last, means for laying the upwiped portion over upon the bottom of an unlipped innersole on the last, and means for inserting fastenings to secure the overwiped portion in lasted position to the innersole.

56. In a machine for working uppers over lasts, the combination of means for wiping successive portions of an upper up the side of a last, a wiper movable to lay the upwiped portion of the upper flat against the bottom of an unlipped innersole, and means for securing the upper and innersole together.

In testimony whereof I have signed my name to this specification.

EVERETT W. VARNEY.